United States Patent

[11] 3,607,037

| [72] | Inventors | Jack D. Terrana<br>Tampa;<br>Leo A. Miller, Lakeland; James A. Taylor, Lakeland, all of Fla. |
|---|---|---|
| [21] | Appl. No. | 785,724 |
| [22] | Filed | Dec. 20, 1968 |
| [45] | Patented | Sept. 21, 1971 |
| [73] | Assignee | Wellman-Lord, Inc. |
| [32] | Priority | Nov. 8, 1968 |
| [33] | | Canada |
| [31] | | 34,756 |
| | | Continuation-in-part of application Ser. No. 681,833, Nov. 9, 1967, now abandoned. |

[54] SEPARATION OF SULFUR DIOXIDE FROM GASES
28 Claims, 3 Drawing Figs.

[52] U.S. Cl. .................................................... 23/178, 23/2
[51] Int. Cl. ......................................................... C01b 17/56
[50] Field of Search ........................................... 23/2, 178, 177

[56] References Cited
UNITED STATES PATENTS

| 2,772,081 | 11/1956 | Hibshmann et al. | 261/114 |
| 2,923,533 | 2/1960 | Berry | 261/116 |
| 3,268,296 | 8/1966 | Hall et al. | 55/85 |
| 3,320,906 | 5/1967 | Domahidy | 23/178 X |
| 3,353,799 | 11/1967 | Lions et al. | 261/117 |
| 3,477,815 | 11/1969 | Miller et al. | 23/178 |

FOREIGN PATENTS

| 418,255 | 10/1934 | England | 23/177 |

OTHER REFERENCES

Perry, Chem. Engrs. Handbood, sect. 14, pp. 24, 27, 30– 33 4th edt. (McGraw-Hill 1963).

Japanese application 42–2251—Shibata Feb. 1, 1967 (supplied by applicant) 23–178

Primary Examiner—Oscar R. Vertiz
Assistant Examiner—Charles B. Rodman
Attorneys—John W. Behringer, Eugene L. Bernard, Martin J. Brown, James N. Dresser, W. Brown Morton, Jr., John T. Roberts, Malcolm L. Sutherland and Morton, Bernard, Brown, Roberts and Sutherland ABSTRACT: Sulfur dioxide is recovered from waste gases by contacting the gas with aqueous sodium, lithium or beryllium sulfite to produce sodium, lithium or beryllium bisulfite and subsequently separating the sulfite to lower the $SO_2^{--}$ partial pressure in the bisulfite which can be decomposed to release sulfur dioxide.

INVENTORS
JACK D. TERRANA
LEO A. MILLER
JAMES A. TAYLOR

SEPARATION OF SULFUR DIOXIDE FROM GASES

This application is a continuation-in-part of application Ser. No. 681,833 of Terrana et al., filed Nov. 9, 1967, now abandoned.

This invention relates to the recovery of sulfur dioxide from sulfur dioxide-containing gases using an aqueous solution of sodium, lithium or beryllium sulfite.

According to one existing practice, sulfur dioxide can be recovered from gases containing large concentrations thereof, e.g. 5 to 20 weight percent sulfur dioxide, by cooling and scrubbing the gas with water which dissolves the sulfur dioxide and then heating the resulting solution to drive off the sulfur dioxide. Gases containing such amounts of sulfur dioxide can be produced, for example, by burning sulfur or sulfur-bearing ores with air. This process, however, requires large quantities of water and fuel and is correspondingly expensive since the solubility of sulfur dioxide in water is not very high and depends upon the percentage of sulfur dioxide in the gases and the temperature of the water used for absorption. Accordingly, this process is generally unsuitable for use with gases containing small concentrations of sulfur dioxide.

Sulfur dioxide is, however, found in significant amounts as a constituent of many waste gases such as smelter gases, off gases from many chemical plants, and stack or furnace gases from coal-burning furnaces such as used in electric power plants, although its concentration is such gases is generally from about 0.001 to less than about 5 mole percent and frequently is less than about 0.5 mole percent (about 1 percent by weight). For example, a modern electric power plant of 1,350,000 kw. capacity will burn about 15,000 tons of coal per day. Much coal contains about 3.5 weight percent sulfur, or even more. The emission of sulfur dioxide from a plant of this size using such coal would then amount to about 1,000 tons per day, although the concentration of sulfur dioxide in the stack gases can be very low, for instance on the order of 0.2 to 0.3 mole percent, depending upon the sulfur content of the coal.

This invention provides for the recovery of sulfur dioxide present in such small concentrations as well as in large concentrations in gases and thus provides for significant abatement of sulfur dioxide-air pollution although it is not limited thereto. Significant amounts, for instance greater than about 75 weight percent, of sulfur dioxide can be removed from such gases.

Although the present invention will be described by reference to the use of sodium sulfite, the use of lithium sulfite to form lithium bisulfite and the use of beryllium sulfite to form beryllium bisulfite are also contemplated. In accordance with this invention, sulfur dioxide in the waste gas is reacted with sodium sulfite in aqueous solution to form an aqueous solution of sodium sulfite and sodium bisulfite and substantially reduce the sulfur dioxide content of the gas, for instance to less than about 0.02 mole percent in a stack gas containing more than about 0.2 mole percent. The sodium sulfite is separated, e.g. crystallized, and can be recovered, and the sodium bisulfite solution is heated to produce sodium sulfite and sulfur dioxide. The sulfur dioxide is drawn off and can be either cooled and compressed to provide a liquid product or sent as a gas to a sulfuric acid plant. The sodium sulfite can be recycled to the reaction zone wherein additional sulfur dioxide is absorbed. The reactions utilized in this invention include:

I. $Na_2SO_3 + SO_2 + H_2O \rightarrow 2NaHSO_3$

II. $2NaHSO_3 \xrightarrow{cool} Na_2S_2O_5(c) + H_2O$

III. $2NaHSO_3 \xrightarrow{heat} Na_2SO_3 + SO_2(g) + H_2O$

For Reaction I to proceed, the temperature should be maintained above the temperature at which sulfur dioxide is absorbed by reaction with the aqueous solution of sodium sulfite, and below the temperature at which sodium bisulfite decomposes or Reaction III proceeds, e.g. below about 230° F. under ambient pressure conditions. In general, the cooler the solution of sodium sulfite, the more readily sulfur dioxide will be absorbed by the solution and react with sodium sulfite. With stack or furnace gases, however, the temperature of the solution will generally be above about 90° F. or 100° F. although ambient temperatures are suitable. Preferably, the temperature is maintained below about 190° F., e.g. at about 120° to 180° or 185° F., since above these temperature ranges Reaction I begins to slow to a point where sulfur dioxide will not be readily absorbed into solution because the partial pressure of the sulfur dioxide becomes too high.

The solution resulting from a reaction of an aqueous solution of sodium sulfite and a stack gas inherently contains many ingredients, for instance the following is an example:

|  | Generally | Weight percent range Usually |
|---|---|---|
| Sodium sulfate | 0 to 10 | 1 to 8 |
| Sodium bisulfite | 5 to 35 | 10 to 30 |
| Sodium sulfite | 10 to 28 | 15 to 25 |
| Water | balance | balance |

The sulfur dioxide is present in chemically combined form, for instance as sodium bisulfite, which can be considered a sulfur dioxide precursor in the solution and is present or in contact with $SO_2$-partial pressure lowering materials, for instance, metal salts, e.g. alkali metal salts, generally the sodium salts such as unreacted sodium sulfite and sodium sulfate, produced by reaction between sulfur trioxide and sodium sulfite. The purity of the sodium bisulfite in contact with the $SO_2$-partial pressure lowering materials is generally less than about 60 wt. percent on a dry basis.

In accordance with an advantageous feature of the present invention sufficient amounts of the $SO_2$-partial pressure lowering materials are separated from the sodium bisulfite to increase the partial pressure of the sulfur dioxide in the sodium bisulfite. The separation of the $SO_2$-partial pressure lowering materials can be effected by any suitable procedure, for instance by selectively extracting the sodium bisulfite from the solution or by extracting any one of the $SO_2$-partial pressure lowering materials from the solution. The separation is preferably conducted by crystallizing the sodium sulfite out of the solution and further treating (for example simultaneously, as shown in FIG. 1 herein) the sodium bisulfite solution in accordance with the invention as set forth below.

The release of sulfur dioxide from a precursor such as sodium bisulfite depends upon its partial pressure under given conditions, e.g. when in association with or without other materials including slats such as sodium sulfate and sodium sulfite which are generally present in the resulting solution produced by reaction of the sulfur dioxide-containing stack gas with the aqueous solution of sodium sulfite. The partial pressure of sulfur dioxide in its precursor in the presence of other materials, e.g. sodium salts, in the reaction product solution at its boiling point at standard pressure conditions is so low that it can not be released in a feasible manner. In contrast to this, its partial pressure when the sodium bisulfite is in relatively pure form, for instance a purity greater than about 85 wt. percent on a dry basis, is relatively high. The purity of the sodium bisulfite is increased in accordance with the present invention to generally greater than about 65 wt. percent, preferably greater than about 85 wt. percent.

The sodium bisulfite solution can be advantageously purified by crystallization of $SO_2$-partial pressure lowering materials, e.g. sodium sulfite, from the solution. Crystallization of sodium sulfite can be accomplished using suitable crystallization procedures, for instance by supersaturating the solution by heating it in a vacuum or advantageously by cooling the aqueous sodium sulfite-bisulfite solution to a temperature at which a substantial portion of the sulfite crystallizes, e.g. below about 100° F. or 110° F. in a vacuum crystallizer and below about 290° F. in a triple effect evaporator.

The sodium sulfite crystals can be separated, e.g. by separation techniques such as centrifugation or filtration, and the remaining sodium bisulfite solution is heated to the decomposition temperature therefor and under ambient pressure conditions; these temperatures are generally greater than about 200° F. and sufficient to decompose the sodium bisulfite, for instance above about 230° F. and up to about 600° F. but preferably below temperatures at which substantial amounts of sodium sulfate form, e.g. 400° F., and preferably below about 300° F. to release sulfur dioxide and convert the sodium bisulfite to sodium sulfite which is suitable for reuse. The sodium sulfite crystals produced can be redissolved in water or the solution resulting from the separation of sulfur dioxide from the sodium bisulfite solution and recycled to the reaction zone.

In accordance with an advantageous embodiment of this invention, the sodium bisulfite solution from which sodium sulfite crystals have been separated can be heated to decompose sodium bisulfite and produce sulfur dioxide although the sodium bisulfite can first be recovered from the solution in crystal form before heating to produce sulfur dioxide. Thus the sodium bisulfite can be advantageously heated in the presence of water to enhance its decomposition to produce sulfur dioxide at relatively low temperatures. The water employed can advantageously be residual water of the mother liquor or it can be added water; it can be in any suitable form, e.g. liquid or vapor form; and it is used in amounts sufficient to enhance the decomposition of the sodium bisulfite to produce sulfur dioxide. These amounts are at least about 0.01 weight percent, generally from about 1 to 99 weight percent and advantageously from about 20 to 75 weight percent based on the sodium bisulfite and water.

The decomposition of the sodium bisulfite in contact superatmospheric water can be conducted under ambient pressure or superatmospheric pressures, for instance from about 0 to 150 p.s.i.a., generally from about 15 to 80 p.s.i.a. although ambient pressures can be advantageously employed. In a modification of this aspect of the present invention, superatmospheric pressures can be employed when the sodium bisulfite is in aqueous solution to increase the concentration of the solution at higher temperatures, e.g. above about 230° F. and up to about 375° F., with a consequent increase in the partial pressure of sulfur dioxide in the sodium bisulfite and an enhancement of the production of sulfur dioxide. Generally the water employed in this aspect is from about 5 to 65 weight percent.

Since there is generally a small amount of sulfur trioxide present in waste gases containing sulfur dioxide, a small amount of sodium sulfate is formed which is periodically removed. Additionally, oxygen present in the waste gases can react with the sodium sulfite to produce additional sodium sulfate so that it may be desirable to add an oxidation inhibitor, e.g. organics such as hydroquinone, etc., to the sodium sulfite solution.

In accordance with the present invention, therefore, an aqueous solution of sodium sulfite is fed to a reaction zone through which a gas containing sulfur dioxide is passed. This solution becomes enhanced with sodium bisulfite in the reaction zone, it is withdrawn from this zone, and sodium sulfite is crystallized out of it in a decomposition zone. The actual removal of $SO_2$ from the bisulfite and its conversion to the sulfite is accomplished by heating the solution of bisulfite, e.g. sodium bisulfite, to above the boiling point of water in the solution and the decomposition temperature to remove substantial amounts of water and most of the $SO_2$.

The present invention will be more fully understood from the following detailed description thereof when read in conjunction with the accompanying drawings in which.

Figure 1:
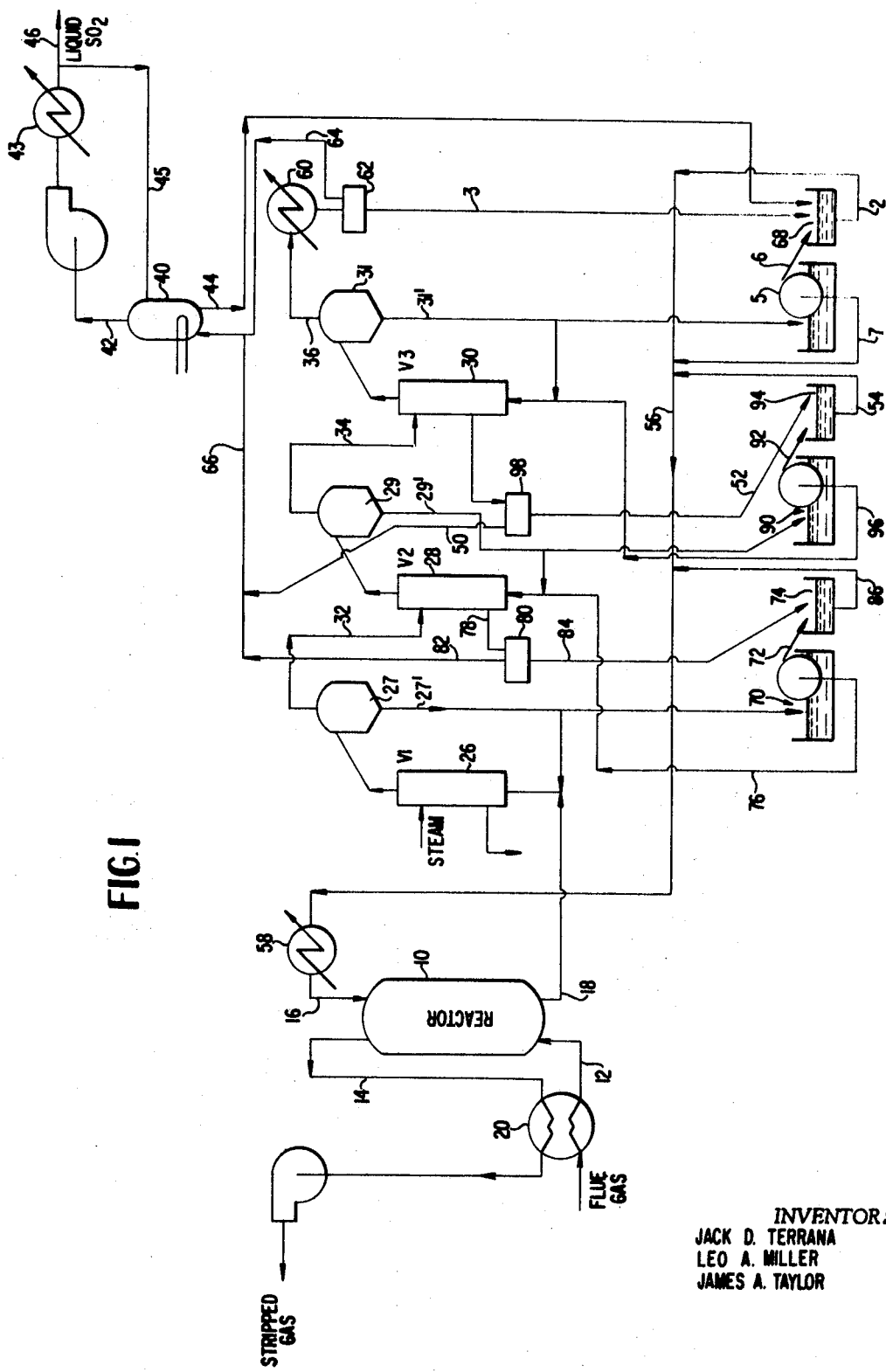
FIG. 1 is a flow sheet of the system for the recovery of $SO_2$ in accordance with this invention.

Referring now to FIG. 1, a gas stream containing $SO_2$, e.g. flue gas from a power plant at a temperature of about 300° F. and containing about 0.3 mol. percent $SO_2$, is introduced into reactor 10 through line 12. The $SO_2$ is absorbed at a temperature of about 125° F. from the flue gas in reactor 10 by reaction with an aqueous sodium sulfite solution at a temperature of about 100° F., containing 72 weight percent (w.p.) water and 28 w.p. solids of which about 60 w.p. is $Na_2SO_3$ and about 40 w.p. is $NaHSO_3$, which is introduced into reactor 10 through line 16. An aqueous sodium bisulfite solution is produced having a temperature of 150° F. and containing 70 w.p. water and 30 w.p. solids of which about 40 w.p. is $Na_2SO_3$ and about 60 w.p. is $NaHSO_3$. The bisulfite solution is removed from reactor 10 through line 18 and the stripped gas, at a temperature of about 150° F. is removed through line 14. The flue gas in line 12 can be passed in countercurrent heat exchange relationship with the stripped gas in heat exchanger 20.

Figure 2:
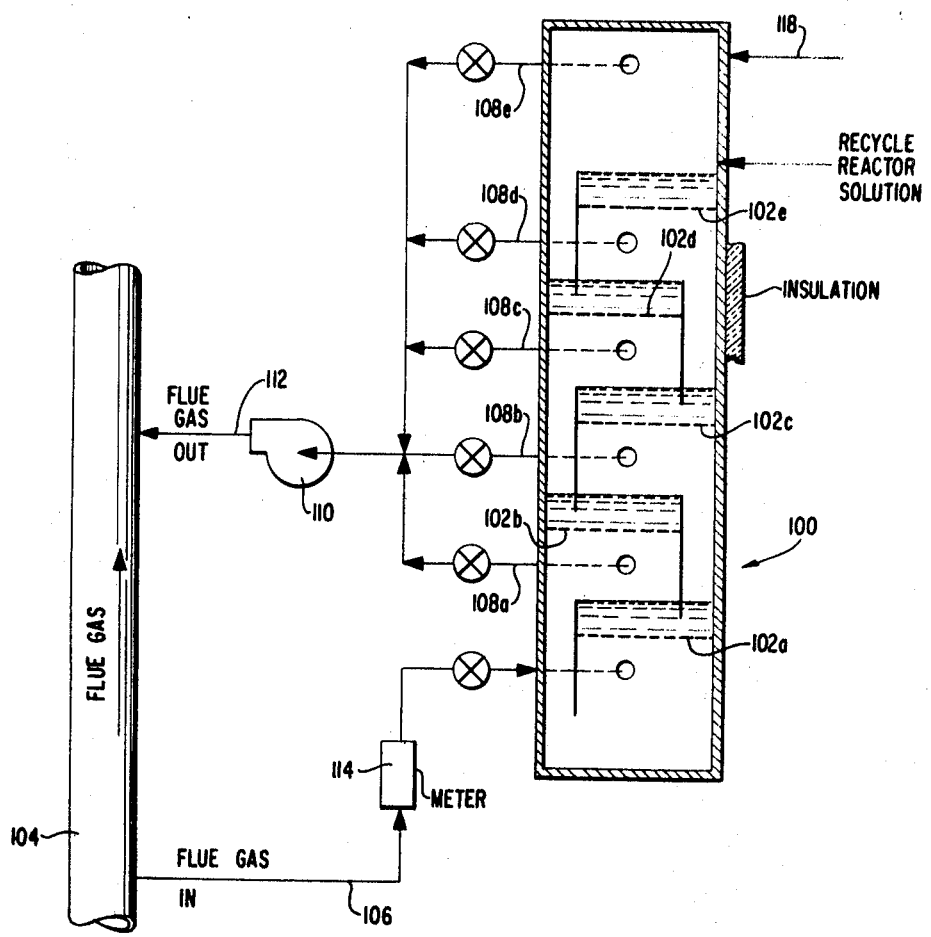
FIG. 2 illustrates in detail a suitable reactor for use with Reaction I.

Reactor 10 is, for example, a column designed for intimate contact of countercurrently flowing gas and liquid streams such as a packed tower or a plate tower containing bubble trays or sieve plates 102 such as shown in FIG. 2. Tower 100 of FIG. 2 has five sieve plates 102a through e although, of course, any desired number can be used. Flue gas is introduced into tower 100 through line 106 from flue gas line 104 and passes upwardly through plates 102 countercurrently to the downwardly flowing aqueous sodium sulfite solution. The stripped gas is removed from the desired point in tower 100 via lines 108a, b, c, d, and/or e and reintroduced into line 104 through line 112 by blower 110. Line 104 can, for example, be a feed line for a stack. Meter 114 in line 106 can be used to regulate the introduction of flue gas through line 106, if desired, to insure complete removal of $SO_2$. Tower 100 is jacketed and insulated. Steam can be introduced into the jacket through line 118 to assist in controlling the temperature of the solution in the tower.

The solution in the reaction zone, i.e. reactor 10, is generally maintained at a temperature sufficient to accomplish Reaction I above and insufficient to decompose the sodium bisulfite produced therein according to Reaction III i.e. below about 230° F. Temperatures of about 100° F. to about 180° F., or 190° F. are suitable for the reaction zone since above this level the rate of reaction I slows and sulfur dioxide does not go readily into solution. Additionally, since the flue gas is passed upwardly countercurrent to the aqueous sodium sulfite solution, it is desirable to maintain the temperature of the gases at a temperature sufficiently high that they will rise in the reaction zone, e.g. about 185° F.

The product of the reaction zone is preferably a saturated aqueous solution of sodium bisulfite, and, accordingly, the concentration of the solution is desirably maintained at just below saturation by the addition of sufficient water to avoid precipitation of sodium sulfite. The amount of solids in the aqueous bisulfite solution will vary depending upon the temperature but at about 150° F. there will generally be between about 25 and 35 weight percent solids in the solution of which about 50 to 70 percent is sodium bisulfite and 30 to 50 percent is sodium sulfite. The sodium sulfite solution introduced into the reaction zone is preferably a recycle stream and, generally contains about 20 to 35 weight percent solids generally of which above about 50 percent, and preferably above about 55 percent, is sodium sulfite and the balance essentially sodium bisulfite. This recycle stream is preferably a nearly saturated solution of sodium sulfite and the temperature is controlled to avoid upsetting the requirements of reactor 10. The temperature of the recycle stream is typically about 90° to 125° F.

The aqueous sodium bisulfite solution removed from reactor 10 through line 18 is conducted to the desorption zone to remove water, crystallize sodium sulfite, and remove a portion of the $SO_2$. The desorption zone can, for example, be a triple effect evaporator having effects V–1, V–2 and V–3, as shown, the temperatures of which are controlled, respectively, by heat exchangers 26, 28 and 30. The temperature and residence time of the bisulfite solution in the desorption zone is controlled to boil the water out of the solution and partially decompose the bisulfite, e.g. between about 212° and below the decomposition temperature of the sodium bisulfite, particularly about 230° F. to 300° F. under superatmospheric conditions, e.g. at pressures generally from about 5 to 50 p.s.i.g. or more. The sulfite-bisulfite solution in line 18 is introduced into effect V-1 and passes through heat exchanger 26 into separator 27 at a temperature of 280° F. and a pressure of 40 p.s.i.g., where water vapor and any $SO_2$ produced by the decomposition of the bisulfite therein are separated from the sulfite-saturated solution. Vapors are removed from separator 27 through line 32 to heat exchanger 28 and the saturated solution is removed through line 27' to rotary vacuum filter 70 wherein sodium sulfite crystals are separated, conducted by conduit 72 to dissolver 74, and are dissolved in a sodium sulfite solution. The solution is recycled as indicated. The filtrate from filter 70, rich with bisulfite, is then passed by line 76 through heat exchanger 28 to effect V-2 into separator 29 at a temperature of 255° F. and a pressure of 20 p.s.i.g. The sulfur dioxide laden vapor from heat exchanger 28 is conducted by line 78 to knockout drum 80 wherein sulfur dioxide is removed through line 82, the resulting condensed water vapor is conducted by line 84 to dissolver tank 74, dissolves sodium sulfite crystals, and the resulting solution is conducted by line 86 to recycle line 56.

Vapors are conducted from separator 29 to heat exchanger 30 through line 34. The solution from effect V-2 passes from separator 29 through line 29' to rotary vacuum filter 90 wherein the sodium sulfite crystals are separated, conducted by conduit 92 to dissolver 94, and are dissolved in the solution. The filtrate from filter 90, is conducted by line 96 to heat exchanger 30, where it is heated. The sulfur dioxide laden vapor is conducted to knockout drum 98 wherein the sulfur dioxide is removed by line 50, the resulting condensate is conducted by line 52 to dissolver tank 94, dissolves sodium sulfite crystals, and the resulting solution is conducted by line 54 to recycle line 56.

The heated solution is conducted from heat exchanger 30 to separator 31 of effect V-3 at a temperature of 235° F. and a pressure of 10 p.s.i.g. The saturated solution is conducted to rotary vacuum filter 5 by line 31' wherein sodium sulfite crystals are separated, conducted by conduit 6 to dissolver 68 and are dissolved in the solution. The filtrate from filter 5, a sulfite-bisulfite solution, is conducted by line 7 to recycle line 56. Vapors are remove from separator 31 through line 36 to condenser 60, the sulfur dioxide laden vapor is conducted to knockout drum 62 wherein sulfur dioxide is removed by line 64 and is combined in line 66 with the sulfur dioxide from lines 50 and 82. The resulting solution is conducted by line 3 to dissolver tank 68, dissolves sodium sulfite crystals, and the resulting solution is conducted by line 2 to recycle line 56. The vapors removed from effects V-1 and V-2 through, respectively, lines 32 and 34 are conveniently used to provide heat for heat exchangers 28 and 30 of effects V-2 and V-3. The amount of water removed in the effects is that sufficient to provide a saturated sodium sulfite solution. If desired, the first effect V-1 can be used to remove water with decomposition occurring primarily in the latter effects by controlling the temperature therein. For example, the temperature in effect V-1 can be maintained above the boiling point of water in the solution and below the decomposition temperature, i.e. 230° F., and effects V-2 and V-3 can be maintained above the decomposition temperature.

The first effect, V-1 is generally operated at an elevated pressure and temperature sufficient to evaporate water and decompose some sodium bisulfite, for instance up to about 150 p.s.i.g. and 600° F., but preferably below temperatures at which substantial amounts of sodium sulfate form, e.g. 400° F. and below pressures of about 100 p.s.i.g. Typically, the first effect separator is operated at a temperature of about 250° to 350° F. and a pressure of about 30 to 70 p.s.i.g. to advantageously produce sulfur dioxide with minimum steam requirements. Each succeeding effect can be operated at a pressure of about 20 p.s.i.g. less than the preceding effect and at corresponding decomposition temperatures.

The $SO_2$ produced in effects V-1, V-2 and V-3 and combined in line 66 is passed through drying still 40 for separation of the $SO_2$ and water; the $SO_2$ being removed overhead through line 42 and the water being removed out the bottom through line 44 and is conducted to dissolver tank 68. $SO_2$ in line 42 is cooled in heat exchanger 43 and liquid $SO_2$ is recycled to still 40 through line 45. $SO_2$ product is removed through line 46.

The solution removed from the desorption zone after separation of $SO_2$ and water vapor, i.e. the solution removed from separator 31 through line 31' is an aqueous solution of sodium bisulfite and sodium sulfite. As mentioned above, the temperature of the desorption zone is preferably controlled to decompose sodium bisulfite in an amount sufficient to recover about 50–70 percent, particularly 60 percent, of the $SO_2$ from the bisulfite solution in line 18. The recycle solution is recycled to reactor 10 through line 56 and heat exchanger 58 and introduced into reactor 10 through line 16. If desired, makeup water, sodium sulfite, etc. can be introduced into tank 68.

EXAMPLE I

The following example, with reference to the above description, further illustrates the invention. A flue gas from coal-burning furnaces used in an electric power plant is scrubbed in an absorption tower or reactor 10 with an aqueous slurry of sodium sulfite containing initially about 25 weight percent solids including about 60 percent sodium sulfite, the remainder being essentially sodium bisulfite. The temperature of the solution withdrawn from reactor 10 is about 150° F. Typical composition of the flue gas in mole percent is: sulfur dioxide, 0.3; oxygen, 3.4; carbon dioxide, 14.2; nitrogen, 76.1; water, 6.0; and sulfur trioxide, 0.0003. It also contains about 1.5 grains of fly ash per cubic foot. With a residence time of about 8 to 12 seconds per plate about 85 percent of the $SO_2$ is removed from the flue gas. The solution removed from tower 10 contains about 30 weight percent solids of which about 60 percent is sodium bisulfite. This solution is heated to about 255° F. in a triple effect evaporator for a residence time sufficient to decompose about 60 percent of the sodium bisulfite and then the solution is passed to a holdup tank. The $SO_2$ evolved in the evaporator is collected. The aqueous solution of sodium sulfite produced in the holdup tank is recycled to the absorption tower.

In a preferred aspect of the present invention, the present system is advantageously integrated with a reaction system involving a prescrubber zone to remove particulate solids, e.g. fly ash, and liquid-soluble, e.g. $SO_3$, components in the waste gases, an absorption or reaction zone to remove $SO_2$; and a moisture entrainment or demister zone. A reaction system of this type is disclosed in commonly owned application Ser. No. 681,680 filed Nov. 9, 1967 in the names of Leo A. Miller and William D. Willis. An illustration of the present invention integrated with this system is set forth in reference to FIGS. 1 and 3 of the drawings.

Figure 3:
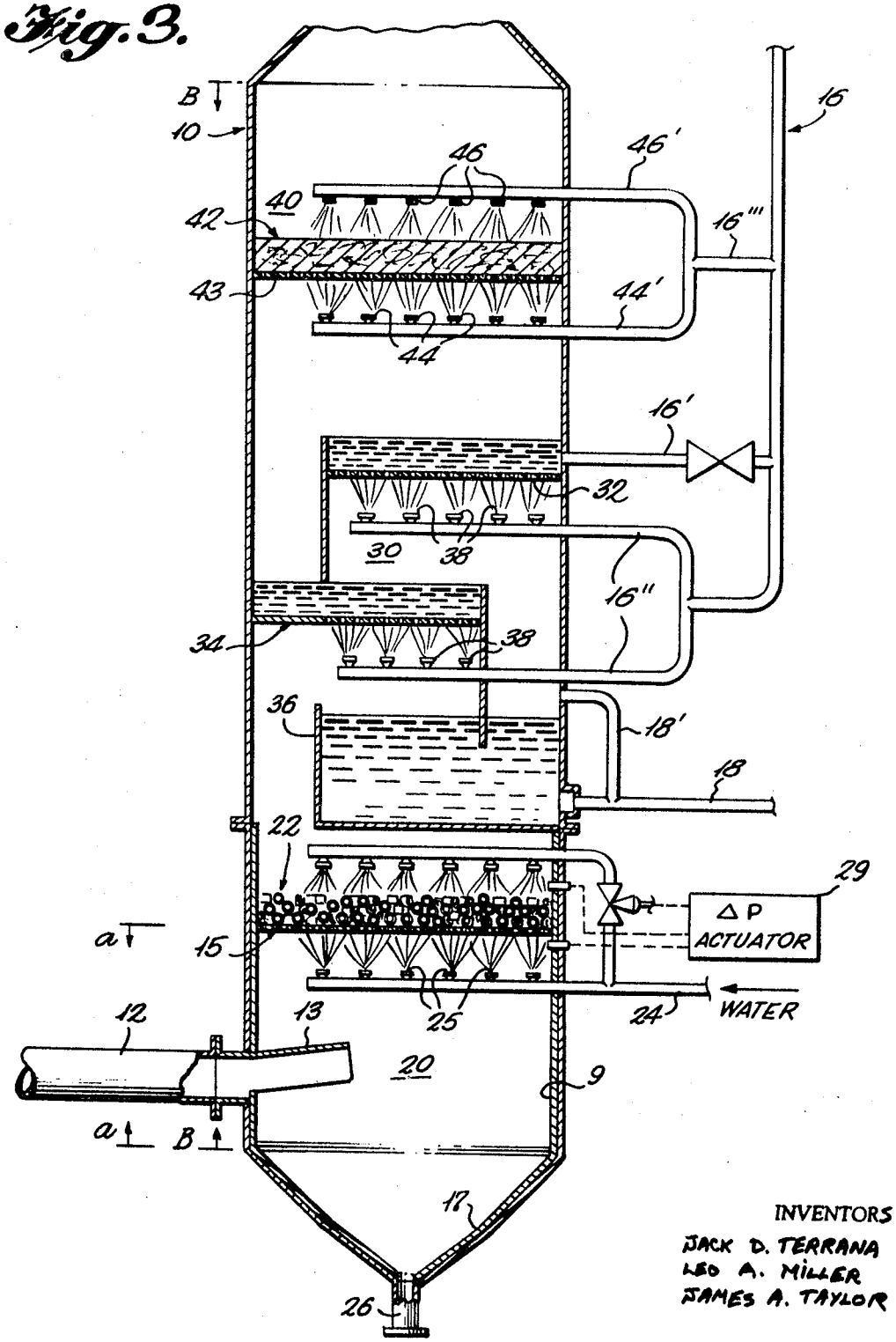
FIG. 3 is a schematic view of another reactor.

Referring now to FIGS. 1 and 3, a gas stream containing sulfur dioxide, e.g., flue gases from a power plant or waste gas from an industrial plant, e.g. a sulfuric acid plant or an aluminum plant, is introduced into reactor 10, having an inside diameter of 30 inches, constructed of 304 type stainless steel and having any suitable corrosion resistant material liner 9 which is resistant against weak sulfuric acid, e.g. lead or suitable synthetic resin liners. The gas passes through line 12, having an internal diameter of 12 inches. The reactor is of a length of 21 feet from line B–B. The amounts and rates given throughout this specification for gas and liquid specifications are based upon a reactor having these dimensions for internal diameter, i.e. 30 inches or a cross-sectional area of about 4.9 square feet, and distances between components positioned in the reactor.

It will be obvious to those skilled in the art that the amounts and rates of gases and liquids used will vary depending upon the size of reactor used and the distances between components employed in the reactor, however, these can be referred to as equivalents within the scope of the invention.

The concentration of sulfur dioxide in such gases is generally from about 0.001 to less than about 5 mole percent. The waste gases may also include $SO_3$, however the concentration of $SO_3$ will vary according to the source of the gases and even flame temperatures used in processing, among other factors. It will usually not be higher than about 0.01 mol percent of the gas, normally being within the range of about 0.001 to 0.01 mol percent, usually the majority, e.g. more than about 70 percent, of the $SO_3$ in the gas is present as $SO_3$ adsorbed on the surface of particulate solids. A particular advantageous feature provided by the prescrubber resides in its capacity to remove minimal amounts, e.g. from about 0.00001 to less than about 0.005 mol percent, of liquid soluble components in the gas stream; this being particularly useful when the gas is treated preliminarily by prescalping as described below and the residual amounts of $SO_3$ in the gas to be treated in the prescrubber is minimal.

The gas stream in line 12 is generally at a temperature of up to about 800° F., often about 150° to 600° F. For example, suitable gas streams for use in this process include flue gases from power plants burning coal or oil which typically have a temperature in the range of 250° or 300° to 360° or 400° F., off gases from sulfuric acid plants which typically have a temperature in the range of 150° to 200° F. and off gases from smelters which can have a temperature of up to about 800° F. However, at temperatures above about 400° F. it may be desirable to cool the gas to a temperature from about 225° F. to 300° F., e.g. by quenching with ambient air, to avoid deleteriously affecting the reactor, reactor lining or prescrubber operation. If the gases are below about 150° F., it may be desirable to heat the gas in line 12 to assist in removal of water from the solution in reactor 10. The flue gases generally have a relative humidity up to about 10 percent, usually from about 1 to 7 percent.

Sulfur dioxide is absorbed from the gas stream in zone 30 of reactor 10 by absorption through reaction with an aqueous solution of sodium sulfite to produce an aqueous solution of sodium bisulfite, and the stripped gases are emitted through stack 14.

The gases, e.g., flue gases in this illustration, introduced through line 12 pass under bonnet 13 which is arranged over the inlet opening of line 12 into reactor 10 and which extends into the reactor 10 a sufficient distance to prevent water or solution from passing in front of the inlet opening of line 12. It advantageously prevents plugging of inlet line 12 by components, e.g. fly ash, recovered from the gas in zone 20. Bonnet 13 extends upwardly at a slight angle to cause liquid to run back to the wall of reactor 10 and around the inlet opening of line 12 which is flush with the wall of reactor 10. The angle of bonnet 13 is generally from about 5° to 60°, preferably about 10° to 45°, e.g. 30°, and bonnet 13 has a diameter at least equal to the diameter of the inlet opening of line 12, e.g. a 12-inch internal diameter. The most upwardly projecting portion of the bonnet in zone 20 is located at a distance sufficiently away from nozzle 25 to avoid destroying the spray pattern but close enough to avoid excessive vaporization of the mist from the spray and droplets falling off of the target and this distance is generally from about 5 to 70 inches, advantageously from about 10 to 30 inches, e.g. 15 inches, in the arrangements described herein. Any liquid running down the wall of reactor 10 or striking the upward surface of bonnet 13 thereby is directed away from the inlet opening and to the wall of reactor 10 without passing directly in front of the inlet opening.

Reactor 10, although advantageously shown as a single vessel, includes three zones which may, if desired, be separate units. These zones are a prescrubber zone 20, an absorption or reaction zone 30, and a moisture entrainment or demister zone 40.

The waste gases entering reactor 10 first pass through prescrubber zone 20 where particulate solid components, e.g. fly ash, and water-soluble components, e.g. $SO_3$, hydrocarbons including methane, ethane, propane, etc., in the gas are selectively removed from the $SO_2$ containing gas, the $SO_2$ in the gas in turn being selectively removed from the gas in zone 30.

Since a majority of the $SO_3$ in the gas is usually adsorbed on the surface of the solids in the gas, it is generally removed upon removal of the solid particles. The solids, e.g. dust, in the gases are generally unreacted materials, e.g. fly ash produced by the chemical plant, or noncombustible components of the fuel.

The chemical makeup of fly ash varies, of course, with the particular fuel being burned, but usually it is composed to a large extent of silica, alumina and iron, with other metal oxides such as oxides of manganese and vanadium frequently being present in minor amounts. Other suspended particulate solids which may be present in the waste gases include, for instance, particulate hollow carbon spheres which are particularly found in oil-burner off-gases, and which, like fly ash, contain significant quantities of adsorbed $SO_3$. The particle size of the suspended solids found in waste gases can be within about 0.5 to 50 microns, but may be much larger, however the predominant number of the particles range up to about 10 microns.

The solids loading in gases can range from about 0.001 to 60 grains per cubic foot of gas, for instance, and for flue gases will generally range from about 1 to 10 grains per cubic foot. If the solids loading of the gas is very high, e.g. generally containing more than about 1, e.g. from about 1 to 10, grains of solid per cubic foot of power plant flue gas, which usually have about 1.2 to 4 grains of solid per cubic foot, and particularly if it contains large particles, e.g. having its longest dimension greater than about one-sixteenth inch, it may be desirable to prescalp the gas, for instance in an electrical precipitator or Cyclone separator (not shown) before introducing the gas in line 12. Generally from about 80 to 90 percent of the particulate solids can be removed by prescalping with a Cyclone separator and a greater amount with an electrical precipitator, which however, is more expensive than the separator. A particular advantageous feature provided by the prescrubber resides in its capacity to substantially remove even minimal amounts, e.g. from 0.001 up to about 1 grain per cubic foot of gas, of particulate solids which are not removed by the use of a separator or electrical precipitator and unless removed, would deleteriously affect the system; moreover, the solids are removed efficiently and with minimum capital cost.

Scrubbing water is introduced via line 24 to the lower section of reactor 10 and is upwardly discharged in the form of a fine spray through spray nozzles 25 having an orifice generally sufficient to provide 0.1 gallons per minute (g.p.m.) per 2,000 cubic feet per minute (c.f.m.) of gas and producing spray in an arc generally from about 10° to 125°, e.g. 75°, having spray droplets ranging in size generally from about 200 to 800 microns, advantageously for removing particulates of a size up to about 60 microns. The temperature of the scrubbing liquid, e.g. water, is generally from about 50° to 120° F., preferably from about 70° to 90° F. Positioned generally from about 4 to 18 inches, e.g. about 9 inches, above the nozzles 25 is a substantially horizontally disposed, fluid, e.g. gas- or liquid-permeable impingement target assembly having little continuous extensive surface. It advantageously consists of columns or tabular members forming a latticelike tray support 15, preferably formed from an expanded metal, e.g. stainless steel. Held by the support 15 is packing material 22 composed of about three layers of randomly arranged, nonporous, packing components, e.g. Raschig rings, Intalox or Berl saddles, preferably of ceramic composition, the individual components having a longest dimension generally from about 0.25 to 3.5 inches, e.g. 1½ inches, and forming a packing column generally from about 1.5 to 5.5 inches in height and advantageously from about 3 to 4 inches in height, weighing generally from about 30 to 70 pounds per cubic foot and having generally from about 50 to 90 percent free space.

As indicated in the drawing, the spray nozzles 25 are positioned near enough to the support 15 to provide a continuous spray of water at a superficial velocity sufficient to overcome gravity, contact and wet the target surface, generally from about 2 to 20 f.p.s. e.g. about 5 f.p.s. The water reaches, contacts and wets the column support and the layer of packing material retained thereon, and falls downwardly as large droplets to carry away particulate solid and $SO_3$ components which are removed from the gas stream. The spray of water entraps the larger solid particles causing them to fall out of the gas stream while partially dissolving water-soluble $SO_3$ in the gas stream and, as the waste gas passes through the impingement material, substantially all, e.g. at least about 90 percent, of the remaining smaller solids and $SO_3$ in the gas strike and stick to the wetted areas of the impingement material, forming droplets which enlarge to a point to overcome the force of gravity and adhesion to the surface of the material and fall or are washed off of the impingement material by the spray of water. Generally, in excess of 95 weight percent, for instance in excess of 99 percent, of the particulate solids may be removed from the gas. The removal of $SO_3$ is particularly desirable since in this system it produces sodium sulfate which deleteriously affects the recovery of $SO_2$ by, for instance, consuming sodium sulfite which would otherwise be consumed by $SO_2$.

Waste gases entering the column via line 12 proceed upwardly through the support 15 and packing 22. The gas is advantageously contacted with the liquid by conducting the gas and liquid concurrently to a fluid, e.g. gas- or liquid-permeable impingement target; the gas being conducted to the target at superficial velocity sufficient at the time of contact with the target to permeate and pass through the target in the presence of a liquid being conducted to the target at a superficial velocity sufficient at the time of contact with the target to wet the target and insufficient to permeate the target in substantial amounts. Generally, the velocity of the gas to the target is sufficient to have a predominant amount, for instance at least 60 volume percent and preferably from about 90 to 100 volume percent, permeate and pass through the target. Generally, the superficial velocity of the gas at the time of contact with the target will range from about 2 to 15 f.p.s. and preferably from about 7 to 12 f.p.s., e.g. 10 f.p.s.

The superficial velocity of the liquid at the time of contact with target is generally from about 2 to 15 f.p.s. and preferably from about 5 to 10 f.p.s., e.g. 8 f.p.s. The amount of liquid employed is sufficient to effect transfer of particulate solid or liquid-soluble components in the gas to the liquid on contact with the target and this will depend upon the amount of particulate solid or liquid-soluble components in the gas, generally the amount of liquid will range from about 0.01 to 1 g.p.m. per 2,000 c.f.m. of gas containing from about 0.5 to 30 grains per cubic foot of particulate solid components and sufficient to dissolve the liquid-soluble components in the gas. The pressure drop of the gas through packing 22 will generally range from about 0.25 to 0.5, e.g. 0.4, inches of water at 2,000 c.f.m. of gas. Moreover, substantial interstitial holdups of liquid in the packing is avoided.

The liquid employed can be any suitable liquid which is chemically inert to the impingement target and which does not deleteriously affect the mass transfer; particularly when the mass transfer of nonsolid components is involved, the liquid is advantageously one that will also selectively dissolve and remove the nonsolid components. For instance, water can be employed to selectively and simultaneously remove particulate solids and $SO_3$ from a gas stream. Suspended solids present in the gases impinge upon and are restrained by the wet surface presented by both the support 15 and the layer of packing material 22. These solids are washed off the packing and support by the downwardly falling, spent scrubbing water which has been checked and driven back by the target assembly. The spent scrubbing water, containing removed solids and absorbed sulfur trioxide, flows by force of gravity down the funnel-shaped sides of collection bottom 17 of column 10 and out the spent scrubbing water discharge line 26. An important feature is the positioning of a surface such as collection bottom 17 in a droplet receiving relationship with the impingement target to receive droplets falling off of the target and remove them from zone 20 before substantial evaporation of the droplets can occur and thus substantially preclude the return of particulate solid, e.g. fly ash, or liquid-soluble, e.g. $SO_3$, components to the target by the incoming gases. Referring to FIG. 3, the distance between points a—a in this illustration is 6 feet and surface 17 projects downwardly at a 60° angle to outlet 26. Suspended solids and sulfur trioxide are thus removed from the waste gases before the latter comes in contact with the chemical absorbing solution. If desired, the spent scrubbing water, which may often have a pH of about 2 to 4, depending on the amount of sulfur trioxide in the waste gases, may be treated for separation and recovery of the solids, e.g., fly ash, and the sulfuric acid. One highly advantageous feature of this prescrubbing arrangement is that low volumes of water can be used to wet the impingement target, a particularly attractive feature since the amount of water within the present system can affect the overall efficiency of the process. Accordingly, it is desirable to only use an amount of water sufficient to contact, wet, and fall from the impingement target surface and collect the particulate solid materials and $SO_3$. Generally, less than about 0.1 g.p.m. of water, preferably from about 0.01 to 0.07 g.p.m., e.g. 0.05 g.p.m., per 2,000 c.f.m. of gases, are used. The advantage of using less than about 0.1 g.p.m. is illustrated in Table I below. By using this prescrubber arrangement, it is possible to control any increase in humidity of the gases passed through prescrubber 20 generally to not over about 8 to 10 percent, preferably 2 percent, and the temperature drop across the prescrubber is generally less than about 6° F., preferably less than about 50° F.

Use of the scrubbing apparatus described here and in the drawings, particularly in FIG. 3, has been found to provide, in addition to an extremely low temperature drop and minimal increase in the relative humidity of the gas across the scrubbing zone, particularly when processing gases at temperatures up to 500° F., an assembly which is surprisingly free of plugging difficulties. If desired, however, there may also be provided in the scrubbing apparatus, a second spray assembly 27 positioned above the target which may be activated periodically by actuating device 29, a pressure drop control, for instance about every 8 to 16 hours for a 1 to 3 minute period, to direct a downward spray on the target and thus irrigate the packing material and provide for continuous operation.

The absorber or reaction zone 30 as shown, is advantageously designed for intimate contact of countercurrently flowing gas and liquid streams, although it may be designed for concurrent flow if desired. As shown, the absorber section is illustrated with two substantially horizontally disposed sieve trays, e.g. which can be of a conventional type. Bubble cap trays can also be used. The gases are passed through reactor 10 at a superficial velocity sufficient to maintain liquid on the contact trays therein but not so great as to blow liquid out of the reactor. Typical average superficial velocities of the gases through absorber section 30 of reactor 10 are generally at least about 1.5 feet per second (f.p.s.) and advantageously from about 2.0 to 8.5 f.p.s. The sodium sulfite solution is introduced into reactor 10 through line 16, generally at a rate of from 0.1 or 0.4 to 20 g.p.m., preferably from about 2 to 8 g.p.m., for each 2,000 c.f.m. of gas, and the sodium bisulfite solution is removed through line 18. Sodium sulfite, generally from about 40 to 60 weight percent, e.g. 50 percent, of the total solution to be introduced, is conducted from line 16 through line 16''' and line 44' of demister 40, described below, to fall onto the surface of tray 32 and flow from tray 32 onto tray 34. Additional solution can be added, if desired, through line 16'. The sodium sulfite reacts with the sulfur dioxide in the gases passing through the sieve trays to produce an aqueous solution of sodium sulfite and sodium bisulfite which passes from tray 34 into the catch basin formed by downwardly projecting baffle 36 from which it is removed through line 18. The sulfur dioxide content of the gas is substantially reduced, for instance, to less than about 0.02 mole percent in a stack gas containing more than about 0.2 mole percent.

Sodium sulfite solution is also advantageously sprayed against the underside of trays 32 and 34 by spray elements 38. Elements 38 are located generally from about 4 to 18 inches, e.g. 9 inches, from their respective trays. The velocity of the liquid is sufficient to overcome gravity. As the sodium bisulfite solution is formed on the trays, water is stripped from the solution by the hot flue gases which tends to supersaturate the solution and crystallize sodium pyrosulfite and plug the trays. Sodium sulfite solution from line 16 is passed to the spray elements through line 16''. The sprays are directed against the bottom of the trays where the hot flue gases first contact the trays, since at this point most evaporation of water occurs and, therefore, crystallization. A sufficient amount of solution is sprayed upwardly against the under or contact surface of the trays to keep the solids dissolved in the solution on the trays, particularly at the surface where the flue gases impinge and thus advantageously provide for continuous operation of the process. It is desired to keep the amount of solution passed to the spray elements as low as possible and generally the amount of solution is less than about 0.1, or 0.4, g.p.m. per 2,000 c.f.m. The higher the temperature of the waste gases, the higher the rate of solution required to be fed to spray elements 38. For example, with gases entering reactor 10 at 300° F., about 0.1 to 0.2 g.p.m. per 2,000 c.f.m. of gas is suitable.

The sodium sulfite solution is passed through the absorber section 30 in an amount sufficient to react with the sulfur dioxide in the flue gas, i.e., absorb the sulfur dioxide in the solution, and produce sodium bisulfite. Generally these are stoichiometric amounts. The solution of sodium sulfite introduced into the reaction zone is preferably a recycle stream and, can contain a sufficient amount of an oxidation inhibitor, for instance hydroquinone, e.g., about 0.001 to 0.1 percent, to inhibit the oxidation of the sulfite ion. The temperature of this stream is controlled to avoid upsetting the requirements of reactor 10. The solution flow rate in absorber zone 30 is normally maintained sufficiently fast, and the residence time of the solution in absorber zone short enough, that crystallization problems do not occur within the absorber zone. The flow rate of the solution will depend upon the temperature of the gas, the amount of $SO_2$ in the gas, the temperature and concentration of the sodium sulfite solution; it will, however, generally range from about 0.1 to 20 g.p.m. preferably from about 2 to 8 g.p.m. per 2,000 c.f.m. of gas.

The product of the reaction zone is removed by line 18 and can be advantageously processed in accordance with the procedure described above in connection with FIG. 1 of the drawings.

The stripped flue gases in reactor 10 pass from absorption zone 30 to the moisture entrainment or demister zone 40 which includes a woven mesh contact area. The pressure drop of the gas through zone 30 will generally range from about 1.5 to 4.5, e.g. 2.5, inches of water at 2,000 c.f.m. of gas. The woven mesh 42 is a material chemically inert to the components of the system, e.g. 304 stainless steel, and similar in structure and appearance to steel wool; it is shown in FIG. 3 as being retained on a column support 43. Sodium sulfite solution from line 16 passes through line 16''', and lines 44'' and 46'' to nozzles 44 and 46, respectively, generally positioned from about 4 to 18 inches, e.g. 9 inches, from 42, which continuously spray the solution onto the woven mesh 42 from opposite sides of the assembly, i.e., top and bottom, to advantageously avoid plugging problems and maintain a continuous operation. The demister zone 40 serves to remove droplets of solution from the gases exiting from reactor 10 to thereby limit chemical losses. The droplet can be liquid or solid forms of the reaction product generally small enough, for instance from about 1 to 100 microns in size, such that it can be supported in the velocity of the rising gas flow, normally between about 2 to 7 f.p.s. It was surprisingly found that when the contact material referred to was of a woven meshlike structure, small amounts of solution could be advantageously employed. However, a material providing a large amount of contact surface and a highly irrigatable contact surface, e.g. Raschig rings, can be employed but require larger amounts, e.g. 15 g.p.m. of solution. The thickness of demister zone 40, e.g. about 1 to 4 inches, is sufficient to remove droplets from the exit gases but not so large as to create a large pressure drop, and the gas flow through demister zone 40 is below the point at which droplets from the contact area would be reentrained. The maximum desirable pressure drop is generally in the range of about ¼ to ½ inch of water and, typically, gas velocities of about 2 to 6 f.p.s. are suitable. Generally, solution is added to the demister zone in an amount sufficient to avoid plugging of the demister and insufficient for entrainment in the exiting gases. This demister embodiment is highly efficient and only requires the use of small amounts of solution. For example, generally about 2 to 5 or 6, preferably about 3 to 3-½, or 4, g.p.m. of solution per 2,000 c.f.m. of gas flow are suitable, being divided preferably equally between nozzles 44 and 46. The amount of solution used will decrease with decreasing concentration of the solution and it is desirable to maintain the flow as low as low as possible. The demister zone 40 also functions to remove the last traces of sulfur dioxide contained in the exiting gases. For example, the demister normally removes an additional 1 to 2 mole percent of the total sulfur dioxide in the incoming waste gases.

EXAMPLE II

Essentially the same procedure used in example I is followed except the flue gas is processed within the conditions and parameters set forth in the above discussions referring to FIGS. 1 and 3 of the drawings and using essentially the same specific examples noted in the discussions having reference to the drawings. The flue gas was preliminarily treated in an electrical precipitator to reduce the fly ash content from about 1.5 to 0.3 grains per cubic foot, and is conducted to prescrubber zone 20 wherein essentially all of the fly ash and $SO_3$ is removed while the temperature of the gas drops from 300° to 255° F. and its relative humidity increases from about 6 to 8 percent.

EXAMPLES III AND IV

Essentially the same procedure used in example I is followed except lithium sulfite is used instead of sodium sulfite for example III and beryllium sulfite is used instead of sodium sulfite for example IV.

We claim:
1. A process for recovering sulfur dioxide from a sulfur dioxide-containing gas comprising contacting said gas with an aqueous solution of sodium, lithium or beryllium sulfite at a temperature below about 230° F. and sufficient to produce an aqueous solution containing said sulfite and the corresponding bisulfite, crystallizing sulfite from said sulfite and bisulfite-containing solution to increase the sulfur dioxide partial pressure of said bisulfite in solution, the resulting aqueous solution containing greater than about 65 weight percent sodium bisulfite on a dry basis, decomposing said bisulfite of increased sulfur dioxide partial pressure at a temperature of above about 200° F. to about 600° F. and under conditions of temperature, pressure and residence time sufficient to decompose bisulfite to sulfur dioxide, water and the corresponding sulfite, and recovering resulting sulfur dioxide.

2. The process of claim 1 in which the sulfite is sodium sulfite.

3. The process of claim 2 in which the aqueous sodium sulfite solution has a sodium sulfite content greater than about 50 weight percent on a dry basis.

4. The process of claim 26 in which sulfite crystals obtained by said crystallization are separated from the sulfite-bisulfite solution.

5. The process of claim 4 in which the sulfite is sodium sulfite.

6. The process of claim 4 in which said crystallization and decomposing are conducted simultaneously.

7. The process of claim 6 in which the decomposition is done while removing water from said sulfite-bisulfite solution.

8. The process of claim 7 in which the sulfite is sodium sulfite.

9. The process of claim 8 in which the aqueous sodium sulfite solution has a sodium sulfite content greater than about 50 weight percent on a dry basis.

10. The process of claim 9 including recycling to said gas contacting an aqueous solution of sodium sulfite prepared by dissolving separated sodium sulfite crystals produced by said crystallization.

11. The process of claim 5 including recycling to said gas contacting an aqueous solution of sodium sulfite prepared by dissolving separated sodium sulfite crystals produced by said crystallization.

12. The process of claim 5 wherein said sodium bisulfite is heated to between about 230° and 400° F. during decomposition.

13. The process of claim 12 wherein the aqueous sodium sulfite solution contacted with said gas is at a temperature from about 90° to 190° F.

14. The process of claim 13 wherein separated sodium sulfite crystals produced by said crystallization are dissolved in water and recycled to said gas contacting, and the sodium sulfite-sodium bisulfite solution is heated under superatmospheric pressures during said decomposition.

15. The process of claim 5 wherein said resulting aqueous solution has greater than about 85 weight percent sodium bisulfite on a dry basis.

16. The process of claim 1 wherein the gas contains sulfur trioxide with or without entrained particulate solids and is preliminarily treated for purifying the gas by removal from the gas of sulfur trioxide with or without said entrained particulate solids.

17. The process of claim 16 in which the removal is by contact of the gas with water.

18. The process of claim 17 wherein entrained particulate solids are in the gas and include fly ash, and the contact with water removes both fly ash and sulfur trioxide from the gas.

19. The process of claim 5 wherein entrained particulate solids are in the gas and include fly ash, and the contact with water removes both fly ash and sulfur trioxide from the gas.

20. A process for recovering sulfur dioxide from a sulfur dioxide-containing gas comprising contacting said gas with an aqueous solution of sodium sulfite at a temperature below about 190° F. to form sodium bisulfite in said solution, simultaneously decomposing in a decomposition-crystallization zone sodium bisulfite in said solution to sulfur dioxide and water and crystallizing sodium sulfite from said solution at a temperature of above about 200° to about 600° F. while removing water from said solution, removing from said decomposition-crystallization zone sodium sulfite crystal-containing aqueous medium undergoing decomposition while maintaining the dissolved sodium bisulfite content of said solution at greater than about 85 weight percent on a dry basis, and recovering sulfur dioxide resulting from said decomposition-crystallization zone.

21. The process of claim 20 wherein removed sodium sulfite crystals are separated and recycled in aqueous solution to said gas contacting.

22. The process of claim 21 wherein the decomposition temperature is in the range of about 230° to 400° F.

23. The process of claim 20 wherein the gas contains sulfur trioxide with or without entrained particulate solids and is preliminarily treated for purifying the gas by removal from the gas of sulfur trioxide with or without said entrained particulate solids.

24. The process of claim 23 in which the removal is by contact of the gas with water.

25. The process of claim 24 wherein entrained particulate solids are in the gas and include fly ash, and the contact with water removes both fly ash and sulfur trioxide from the gas.

26. The process of claim 24 wherein sodium sulfite crystals of said crystal-containing aqueous medium removed from said decomposition-crystallization zone, are separated and recycled in aqueous solution to said gas contacting.

27. The process of claim 26 wherein the decomposition temperature is in the range of about 230° to 400° F.

28. The process of claim 27 wherein entrained particulate solids are in the gas and include fly ash, and the contact with water removes both fly ash and sulfur trioxide from the gas.

UNITED STATES PATENT OFFICE
CERTIFICATE OF CORRECTION

Patent No. 3,607,037  Dated September 21, 1971

Inventor(s) Jack D. Terrana, Leo A. Miller, James A. Taylor

It is certified that error appears in the above-identified patent and that said Letters Patent are hereby corrected as shown below:

Column 1, line 64, an arrow (⟶) should be inserted after "$H_2O$"; line 65, an arrow (⟶) should be inserted under "cool"; line 66, an arrow (⟶) should be inserted under "heat".

Column 2, line 49, "slats" should read --salts--.

Column 3, lines 32-33, "superatmospheric" should be deleted.

Column 11, lines 58-59, should read --tion from line 16 passes through line 16''', and lines 44' and 46' to nozzles 44 and 46, respectively, generally positioned--.

Column 12, line 67, "26" should read --1--.

Signed and sealed this 25th day of April 1972.

(SEAL)
Attest:

EDWARD M. FLETCHER, JR.
Attesting Officer

ROBERT GOTTSCHALK
Commissioner of Patents